United States Patent [19]
Pettersson

[11] Patent Number: 5,990,260
[45] Date of Patent: Nov. 23, 1999

[54] BRANCHED ALKENYL FUNCTIONAL POLYESTER

[75] Inventor: Bo Pettersson, Helsingborg, Sweden

[73] Assignee: Perstorp AB, Perstorp, Sweden

[21] Appl. No.: 09/091,566

[22] PCT Filed: Dec. 19, 1996

[86] PCT No.: PCT/SE96/01718

§ 371 Date: Sep. 8, 1998

§ 102(e) Date: Sep. 8, 1998

[87] PCT Pub. No.: WO97/23539

PCT Pub. Date: Jul. 3, 1997

[30] Foreign Application Priority Data

Dec. 22, 1995 [SE] Sweden ................................. 9504652

[51] Int. Cl.[6] .................................................. C08G 63/00
[52] U.S. Cl. .......................................................... 528/190
[58] Field of Search ............................................. 528/190

[56] References Cited

U.S. PATENT DOCUMENTS 3,669,939  6/1972  Baker et al. ............................. 528/176

FOREIGN PATENT DOCUMENTS

WO 93/17060  9/1993  WIPO .
WO 96/12754  5/1996  WIPO .

OTHER PUBLICATIONS

Kirk–Othmer *Encyclopedia of Chemical Technology*, Third Edition, vol. 1, pp. 386–413 ("acrylic ester polymers"), John Wiley & Sons (1978).

Kirk–Othmer *Encyclopedia of Chemical Technology*, Third Edition, vol. 2, pp. 97–106 ("allyl compounds"), John Wiley & Sons (1978).

*Primary Examiner*—Terressa Mosley
*Attorney, Agent, or Firm*—Scully, Scott, Murphy & Presser

[57] ABSTRACT

A branched alkenyl functional polyester of a prepolymer having at least one carboxyl and at least three hydroxyl groups, which is made allylfunctional by reaction between at least one of said hydroxyl groups in the prepolymer and at least one monomeric or polymeric compound having at least one allylic unsaturation. The prepolymer is a condensation product obtained by condensing at least one monomer selected from the group consisting of di, tri or polyhydroxyfunctional monocarboxylic acids having 2–18 carbon atoms optionally followed by further chain extension by addition of at least one monohydroxyfunctional monocarboxylic acid or corresponding lactone having 2–24 carbon atoms.

32 Claims, No Drawings

BRANCHED ALKENYL FUNCTIONAL POLYESTER

The present invention relates to a highly branched alkenyl functional polyester having at least one allylic or acrylic unsaturation. Said unsaturation is introduced by addition of at least one allyl or acryl functional monomer or polymer to terminal hydroxyl groups in a prepolymer obtained by condensing at least one hydroxyfunctional monocarboxylic acid. The alkenyl functional polyester of the invention has, contrary to ordinary randomly branched alkenyl functional polyesters, a controlled branching and a structure wherein all introduced allylic or acrylic unsaturations substantially are pointed in the same molecular direction. In a further aspect, the invention refers to a resin composition comprising said alkenyl functional polyester and in yet another aspect to a thermosetting material produced from said resin composition.

Alkenyl functional ester and polyesters, such as unsaturated ester and polyesters having maleic, allylic, acrylic and/or aromatic unsaturation and drying alkyds, are well-known and have been manufactured for a very long time. The unsaturation of ordinary unsaturated esters and polyesters are normally derived from unsaturated carboxylic acids, such as acrylic acids, fatty acids, maleic anhydride or from unsaturated alcohols, such as alkanol allyl ethers. Alkanol allyl ethers are for instance frequently used as polyester and alkyd components to impart oxygen and heat convertible properties plus improved physical and chemical properties to resins. A further class of alkenyl functional resins can be exemplified by allyl functional polyesters obtained by co-esterifying for instance a hydroxy or carboxyfunctional allyl ether or ester with mono or difunctional carboxylic acids and mono, di, tri and polyfunctional alcohols. Yet a further class can be exemplified by esters and polyesters having one or more acrylic unsaturations derived from for instance acrylic acid, methacrylic acid, crotonic acid (β-methacrylic acid) or glycidyl(meth)acrylate. Esters and polyester having one or more maleic unsaturations derived from maleic anhydride or fumaric acid are also well-known and frequently used. A separate and widely used class of unsaturated polyester are drying alkyds wherein the unsaturation substantially are derived from one or more drying oils or fatty acids. Various combinations of said unsaturations are of course possible and well-known in the art.

Allyl ethers as disclosed above can suitably be exemplified by the commonly used alkanol allyl ethers glycerol mono or diallyl ether, trimethylolpropane mono or diallyl ether and pentaerythritol mono, di or triallyl ether. Further well-known examples of hydroxyfunctional allyl ethers include allyl ethers or monosaccharides and sugar alcohols and the like, such as glycosides, galactosides, talitol, mannitol, dulcitol, iditol, sobitol, arabinitol and xylitol. A general procedure for preparation of allyl ethers is reacting a hydroxyfunctional compound, such as an alcohol, with for instance allyl chloride in a caustic medium.

Ordinary branched alkenyl functional polyesters, such as said unsaturated polyesters and said alkyds based on or containing for instance allylic, acrylic and/or maleic unsaturation exhibit many good properties but are also submitted to some drawbacks related to for instance, drying or curing properties, rheological properties and ratio between viscosity and molecular weight. A branched alkenyl functional polyester is normally a high molecular and randomly branched compound with a broad dispersivity and exhibits due to this a very high viscosity in relation to its molecular weight.

Various unsaturated compounds and reactions therewith are thoroughly disclosed and discussed in available literature on chemical as well as polymer science and technology, such as Kirk-Ottmer, "Encyclopedia of Chemical Technology"—Wiley-Interscience Publication, 1980. vol. 1 pp.386–413 "Acrylic Ester Polymers" and vol. 2, pp. 97–106 "Allyl Compounds" and "Encyclopedia of Polymer Science and Technology"—John Wiley & Sons, Inc. 1967, vol. 2, pp. 750–807 "Allyl Polymers" and vol. 11 pp. 129–168 "Polyesters, Unsaturated".

It has quite unexpectedly beer found that well-known drawbacks related to ordinary branched alkenyl functional polyesters can be solved or reduced by an entirely new class of branched alkenyl functional polyesters in accordance with the present invention. The alkenyl functional polyester of said invention has a highly controlled and easily reproduced branching density and structure. Alkenyl functional polyesters having a high molecular weight and a high and degree of branching, which are necessary to give good performance characteristics, as well as having so low a viscosity that they can be used without or with only a minor addition of diluting solvents, monomers or other diluting compounds can be obtained.

The branched alkenyl functional polyester of the present invention is yielded from a prepolymer having at least one carboxyl group and m hydroxyl groups, whereby m is an integer and at least 3, such as 3, 4, 5, 6, 8, 10, 16 or 32. The prepolymer is a condensation product obtained by condensing at least one monomer selected from the group consisting of di, tri and polyhydroxyfunctional monocarboxylic acids having 2–18 carbon atoms. The yielded condensation product is said prepolymer or can be used as an intermediate condensation product for optional further chain extension by addition of at least one monohydroxyfunctional monocarboxylic acid or an inner ether thereof, a lactone, having 2–24 carbon atoms. The optional addition of a monohydroxyfunctional monocarboxylic acid is performed by esterification at a molar ratio intermediate condensation product to said monohydroxyfunctional monocarboxylic acid of 1:1 to at least 1:m. The prepolymer, the condensation product with or without the optional further chain extension, is made alkenyl functional by addition of at least one monomeric or polymeric compound having at least one allylic or acrylic unsaturation. The addition is performed at a molar ratio prepolymer to said allylic or acrylic compound of 1:1 to at least 1:m, whereby a branched alkenyl functional polyester having at least one allylic or acrylic unsaturation is yielded.

The alkenyl functional polyester of the present invention is advantageously used as a resin modifier or additive, such as a rheology modifier, for instance providing pseudoplastic properties, tixotrophy, improved flowability, reduced sagging and the like. The alkenyl functional polyester can furthermore be used to adjust such properties as the shear rate and/or the drying or curing of a resin composition, a coating or the like. The alkenyl functional polyester of the present invention can of course be used as sole resin, such as a substitute for ordinary unsaturated polyesters, in a for instance a coating or other type of resinous composition.

Through the present invention it has been possible to for instance produce a thermosetting, radiation curing or autoxidatively drying material, such as composites or coatings, wherein the resin matrix has increased toughness properties without, or only slightly altering processability, thermal and other mechanical properties. The resin matrix is based on ordinary compounds or resins combined with the alkenyl functional polyester of the present invention. Composites are used in a wide variety of applications, each requiring specific properties from included components. The versatility of material property design and processing possibilities with for instance thermosetting composite materials have been and will remain a major driving force for the use thereof. However, certain drawbacks still remain. Among these are some properties related to the mechanical anisotropy and often relatively high processing costs. The mechanical properties are mainly influenced by the properties, for instance the toughness, of the resin matrix The matrix toughness is one of the most important intrinsic properties, of for instance a composite material, controlling various observable damages and failure mechanisms. The toughening properties of the alkenyl functional polyester of the present invention are excellent and most important, toughening can be obtained without imparting the matrix modulus or the thermal properties. Some important applications areas of composites, wherein the resin matrix advantageously comprises the alkenyl functional polyester of the present invention, include aeronautic goods and articles, nautic goods and articles, chemicals/chemical goods and articles, automotive goods and articles, sporting goods and articles, leisure/commodity goods and articles and electric/electronic goods and articles.

The alkenyl functionality of the polyester of the present invention can be adapted to any resin system to provide appropriate number and location of reactive allylic or acrylic unsaturations. The alkenyl functional polyester is therefore not as sensitive to different resin and matrix chemistry as for instance ordinary allylic or acrylic polyesters, which often require a modification of the entire resin or matrix chemistry. The alkenyl functional polyester of the present invention enhances filmproperties quite different from corresponding properties obtained by ordinary allylic and acrylic polyesters as well as different from conventional unsaturated polyesters in general. The structure of the alkenyl functional polyester of the present invention impart markedly increased surface properties, such as curing/drying time, hardness and scratch resistance.

The di, tri or polyhydroxyfunctional monocarboxylic acid of the prepolymer is in preferred embodiments of the invention selected from the group consisting of dihydroxy, di(hydroxymethyl), trihydroxy and tri(hydroxymethyl) monocarboxylic acids having said 2–18, such as 4–12, carbon atoms. These hydroxyfunctional acids can suitably be exemplified by 2,2-dimethylolpropionic acid, α,α-bis(hydroxy-methyl)butyric acid, α,α,α-tris(hydroxymethyl) acetic acid, (α,α-bis(hydroxy-methyl)valeric acid, α,α-bis(hydroxy)propionic acid, α,β-dihydroxypropionic acid and mixtures thereof or therewith. Suitable hydroxyfunctional monocarboxylic acids are, furthermore, aromatic acids such as 3,5-dihydroxybenzoic acid and polyhydroxyfunctional acids such as heptonic acid. The optional monohydroxyfunctional monocarboxylic acid or lactone, having said 2–24 carbon atoms, of the prepolymer is preferably and suitably selected from the group consisting of hydroxyacetic acid, hydroxyvaleric acid, hydroxypropionic acid, hydroxypivalic acid, hydroxystearic acid, glycolide, δ-valerolactone, β-propiolactone, ε-caprolactone and mixtures thereof or therewith.

A compound having at least one allylic unsaturation is in some preferred embodiments suitably selected from the group consisting of allylhalids, such as allylchloride and/or allylbromide, whereby said addition is performed by reaction between said allylhalid and at least one hydroxyl group in the prepolymer, and adducts between at least one di, tri or polycarboxylic acid or anhydride and at least one allyl functional alcohol having at least one allylic or acrylic unsaturation and at least one reactive hydroxyl group, whereby said addition is performed by esterification or transesterification. The di, tri or polycarboxylic acid or anhydride of said adduct is preferably an aliphatic dicarboxylic acid or anhydride having 3–30 carbon atoms, such as maleic acid or anhydride, fumaric acid, adipic acid, azelaic acid, succinic acid or anhydride, sebacic acid, diglycolic acid, trimelletic anhydride, glutaric anhydride and mixtures thereof or therewith. The allyl functional alcohol of said adduct is preferably an allyl ether, such as an alkanol allyl ether, obtained by reacting a di, tri or polyhydric alcohol with at least one allylhalid at a molar ration yielding an alkanol allyl ether having at least one reactive hydroxyl group. Preferred alkanol ethers can be exemplified by glycerol monoallyl ether, glycerol diallyl ether, trimethylolethane monoallyl ether, trimethylolethane diallyl ether, trimethylolpropane monoallyl ether, trimethylolpropane diallyl ether, pentaerythritol monoallyl ether, pentaerythritol diallyl ether, pentaerythritol triallyl ether and mixtures thereof or therewith. Further suitable allyl ethers include allyl ethers of monosaccharides and sugar alcohols, such as glycosides, galactosides, talitol, mannitol, dulcitol, iditol, sobitol, arabinitol and xylitol as well as derivatives thereof. The adduct is in the most preferred embodiments, employing said adduct, a reaction product between azelaic acid, succinic acid, succinic anhydride or sebacic acid and glycerol diallyl ether, trimethylolethane diallyl ether, trimethylolpropane diallyl ether or pentaerythritol triallyl ether.

A compound having at least one acrylic unsaturation is preferably selected from the group consisting of acrylic acid, methacrylic acid and crotonic acid (β-methacrylic acid), whereby said addition is performed by esterification. Suitable acrylic compounds are also for instance epoxide or anhydride functional (meth)acrylates such as glycidylmethacrylate.

In a further aspect, the present invention relates to a resin composition comprising, in addition to the alkenyl functional polyester of the present invention, at least one conventional aliphatic, cycloaliphatic or aromatic monomeric or polymeric compound or resin in an amount of 1–99%, such as 10–90% or 20–80% and preferably 25–75% by weight, and optionally at least one curing agent, drying agent, catalyst, inhibitor, stabilizer, solvent and/or property adjusting additive.

The alkenyl functional polyester according to the present invention can suitably participate in the production of a polymeric or resinous composition as modifier providing previously disclosed advantages and properties. Furthermore, the alkenyl functional polyester is, also as previously disclosed, advantageously used to produce a thermosetting, radiation curing or autoxidatively drying material, such as a coating, a moulding powder or a composite, wherein the resin matrix has increased toughness properties without, or only slightly altering processability, thermal and other mechanical properties.

The resin composition of the present invention is preferably a composition selected from the group consisting of i) a radiation curing, a thermosetting or an autoxidatively drying binder composition for coating systems;

ii) a radiation curing, thermosetting or drying resin composition;

iii) a thermoplastic composition;

iv) an adhesive composition;

v) a microlithographic coating or resist;

vi) a composite reinforced with glass, aramid or carbon/graphite fibres; and vii) a dental material.

The conventional compound or resin of the composition is in preferred embodiments an ordinary saturated or unsaturated ester or polyester, such as an unsaturated ester or polyester having at least one maleic, vinylic, allylic or acrylic unsaturation. The polyester is optionally is a linear or branched hydroxy and/or carboxyfunctional polyester and preferably of general formula

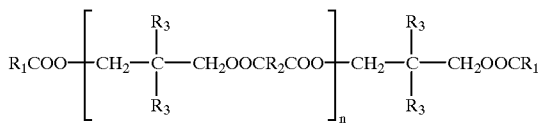

or of general formula

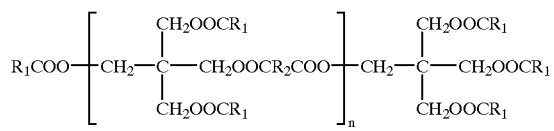

wherein each $R_1$ independently is an alkanyl or alkenyl moiety of a saturated or unsaturated monofunctional carboxylic acid, each $R_2$ independently is an alkanyl, alkenyl or aryl moiety of a difunctional saturated or unsaturated carboxylic acid, each $R_3$ independently is hydrogen or unesterified alkanyl or alkenyl and wherein n is an integer being at least 1.

The resin composition comprises in certain embodiments and in addition to said components at least one dendritic or hyperbranched macromolecule. The dendritic or hyperbranched macromolecule is composed of a monomeric or polymeric nucleus having at least one reactive epoxide or hydroxyl group to which 1–100, preferably 1–20, generations of at least one monomeric or polymeric chain extender having at least two reactive hydroxyl groups and at least one reactive carboxyl group or at least two reactive carboxyl groups and at least one reactive hydroxyl group is added, whereby a macromolecule having substantially hydroxyl or carboxyl groups as terminal functions is yielded, which macromolecule optionally by addition, to at least one of said terminal functions, of at least one monomeric or polymeric compound is provided with at least one epoxide, amino, alkenyl or anhydride group.

The resin composition may also in addition to said compounds or resins comprise at least one monomer or diluent, which preferably has at least one maleic, vinylic, allylic or acrylic unsaturation, such as styrene and N-vinylpyrrolidone, esters of acrylic acid, methacrylic acid or crotonic acid and an alcohol or an alkoxylated alcohol. An alkoxylated alcohol is an adduct of an alcohol and at least one alkylene oxide, such as ethylene oxide, propylene oxide, butylene oxide or phenyletlhylenie oxide. Suitable alcohols are to be found in the group consisting of glycols, such as propylene glycol, tripropylene glycol and neopentyl glycol, and triols or tetrols, such as glycerol, trimethylolpropane, trimethylolethane or pentaerythritol and alkoxylates thereof. Further suitable alcohols include alkanol allyl ethers, such as glycerol allyl ethers, trimethylolpropane allyl ethers or pentaerythritol allyl ethers and alkoxylates. The monomer or diluent can furthermore be a compound of for instance general formula $(R_3-O-R_6)_p-R_4-(R_6-O-R_5)_q$ wherein p and q independently is 1, 2 or 3 and wherein $R_3$ is hydrogen, alkyl, alkenyl, alkynyl, cycloalkyl, cycloalkenyl, cycloalkynyl, aryl, alkylaryl, alkenylaryl, alkynylaryl and/or branched variations thereof, $R_4$ is alkyl, alkenyl, alkynyl, cycloalkyl, cycloalkenyl, cycloalkynyl, aryl, alkylaryl, alkenylaryl, alkynylaryl and/or branched variations thereof, $R_5$ is alkyl, alkenyl, alkynyl, cycloalkyl, cycloalkenyl, cycloalkynyl, aryl, alkylaryl, alkenylaryl, alkynylaryl and/or branched variations thereof and wherein $R_6$ is CO or $CH_2$, whereby at least one substituent $R_3$, $R_4$ or $R_5$ comprises at least one ethylenic unsaturation. Compounds of above formula can suitably be exemplified by esters of acrylic acid, methacrylic acid or crotonic acid and an alkanol allyl ether, such as trimethylolpropane diallyl ether or pentaerythritol triallyl ether at a molar ratio acid to alkanol allyl ether of 1:0.8 to 1:2.2.

In yet a further aspect, the present invention refers to a thermosetting material made from said resin composition. The thermosetting material is cured or partially cured and the material comprises in addition to said resin composition optionally at least one filler, pigment, lubricant and/or reinforcing material, such as fibres in the form of webs, cloths, sheets, threads or cut fibres. Said fibres are preferably and advantageously selected from glass fibres, graphite/carbon fibres, aramide fibres and/or organic fibres, such as cellulose.

Various embodiments of the thermosetting material include for example moulding powders, decorative or industrial laminates and so called prepregs obtained by a partial curing to a so called B-stage of rolls, sheets, webs, cloths, threads or cuttings impregnated with the thermosetting resin composition. Curing of at least one such prepreg can yield a decorative or industrial laminate. Further suitable embodiments include protective and decorative coatings, such as primers and top coats, adhesives and glues.

The thermosetting material according to the invention is preferably used in the production of semi-finished and finished goods and articles selected from the group consisting of aeronautic goods and articles, nautic goods and articles, chemicals and chemical goods and articles, automotive coatings, automotive goods and articles, sporting goods and articles, leisure and commodity goods and articles and electric and electronic goods and articles. Said semi-finished or finished goods or articles are suitably produced using processing techniques such as resin immersion or infusion, compression transfer, vacuum moulding, transfer moulding, injection moulding, gas assisted injection moulding, structural injection moulding, filament winding, extrusion, rotary moulding, gravity moulding and blow moulding and furthermore, at least one surface of the semi-finished or finished thermosetting material of the present invention can in certain embodiments suitably be metal plated or metal clad.

A process for preparation of the prepolymer, made allyl or acryl functional according to the present invention, is suitably a process in one or more steps. A preferred process can be exemplified as follows:

a) condensing a branching chain extender with further molecules of the same chain extender and/or with further molecules of at least one other branching chain extender, which branching chain extenders have at least three reactive sites of which one is a carboxyl group and at least two are hydroxyl groups, the condensation being performed at a reaction temperature of 0–300° C., preferably 50–250° C., and in an amount yielding a prepolymer having at least three hydroxyl groups; and optionally b) condensing the prepolymer of Step (a) with further molecules of said branching chain extenders or with at least one spacing chain extender having one reactive carboxyl and one reactive hydroxyl group, the condensing being performed at a reaction temperature of 0–300° C., preferably 50–250° C., and in an amount or in a number of steps at least equal to requested chain extension.

The condensations can normally be carried out without using a catalyst. A catalyst is, however, often used or preferred in many cases and is then suitably selected from the group consisting of:

i) a Bronsted acid;
ii) a Lewis acid;
iii) a titanate;
iv) metallic zinc or an organic or inorganic zinc compound;
v) metallic tin or an organic or inorganic tin compound;
vi) metallic lithium or an organic or inorganic lithium compound; and
vii) triphenylphosphine or a derivative thereof.

These and other objects and the attendant advantages will be more fully understood from the following detailed description, taken in conjunction with embodiment Examples 1–11 and Table 1, wherein:

Example 1: Preparation of a prepolymer according to the invention by condensing a dihydroxyfunctional monocarboxylic acid.

Example 2: Preparation of an intermediate polymer from the prepolymer of Example 1. The polymer is intended to be further processed and made alkenyl functional in accordance with the present invention.

Example 3: Preparation of an adduct between an alkanol allyl ether and an anhydride. The adduct is intended to be used for alkenyl (allyl) functionalization in accordance with the present invention.

Example 4: Preparation of an alkenyl (allyl) functional polyester according to the invention. The alkenyl functional polyester is prepared from the products of Example 2 and 3.

Example 5: Preparation of an unsaturated thermosetting resin composition comprising the alkenyl functional polyester of Example 4.

Example 6: Comparative Example—Preparation of an unsaturated thermosetting resin composition comprising only conventional unsaturated resins outside the scope of the invention.

Example 7: Preparation by moulding of thermosetting materials based on the unsaturated thermosetting compositions of Examples 5 and 6

Example 8–11: Evaluations ofthe thermosetting materials prepared by moulding according to Example 7.

Table 1: Results from evaluations according to Examples 8–11.

EXAMPLE 1

1230.84 g (9.18 moles) of 2,2-dimethylolpropionic acid was charged in a 4-necked reaction flask equipped with stirrer, pressure gauge, cooler and receiver. The temperature was during 30 minutes raised from room temperature to 145° C. at which temperature a clear solution was obtained. 9.85 g of p-toluene sulphonic acid was then added and a vacuum of 10 mm Hg was applied. The reaction was thereafter under said conditions and stirring allowed to continue for a further 360 minutes until an acid value of 16–17 mg KOH/g was reached.

Obtained prepolymer exhibited the following properties:
Final acid value, mg KOH/g: 14.4
Hydroxyl value, mg KOH/g- 494 (theoretical value: 496)
Molecular weight, g/mole: 3963 (theoretical value: 3618)

EXAMPLE 2

347.62 g of the prepolymer of Example 1, 115.69 g (1.56 moles) of propionic acid and 9.3 g of heptane (azeotropic solvent) were charged in a 4-necked reaction flask equipped with stirrer, nitrogen inlet, cooler and water trap (Dean-Stark). The temperature was during 35 minutes raised from room temperature to 120° C. The reaction was thereafter at said temperature and under stirring allowed to continue for a further 360 minutes, after which time the temperature was raised to 140° C. and propionic acid corresponding to the amount obtained in the water trap was charged to the reaction mixture. Reaction was then continued for another 240 minutes until an acid value of≈15 mg KOH/g was reached. Full vacuum was now applied to remove residual heptane.

Obtained propionated intermediate product exhibited the following properties:
Final acid value, mg KOH/g: 14.2
Hydroxyl value, mg KOH/g: 185
Theoretical molecular weight, g/mole: 4499
Non-volatile content, %: 100.0

EXAMPLE 3

1749.33 g (8.30 moles) of trimethylolpropane diallyl ether (TMPDE 90, Perstorp AB, Sweden), 666.18 g (6.66 moles) of succinic anhydride and 120.5 g of heptane were charged in a 4-necked reaction flask equipped with stirrer, nitrogen inlet, cooler and water trap (Dean-Stark). The temperature was during 25 minutes raised from room temperature to 120° C., at which temperature a clear Solution was obtained and an exotherm giving raise to a temperature increase from said 120° C. to 140° C. was observed. The reaction mixture was, when the exotherm had levelled out, heated to 160° C., at which temperature water started to form. 1.21 g of p-toluene sulphonic acid was then added and the reaction mixture was kept at 160° C. for a further 60 minutes and then cooled to room temperature. 3.2 g of Ca(OH)$_2$ and a filtering aid were then added and the solution was passed through a pressure filter. Residual heptane was now remove from the filtrate in a roll-evaporator.

Obtained allyl functional reactive adduct exhibited the following properties:
Final acid value, mg KOH/g: 125.7
Viscosity, Brookfield, 23° C., mPas: 118
Non-volatile content, %: 94.4

EXAMPLE 4

97.04 g of the product according to Example 2 and 129.23 g of the product according to Example 3 and 9.0 g of heptane were charged in a 4-necked reaction flask equipped with stirrer, nitrogen inlet, cooler and water trap (Dean-Stark). The temperature was during 15 minutes raised from room temperature to 80° C., at which temperature 0.45 g of hydroquinone (10% by weight in ethanol) was added. The temperature was then raised to 115° C. and 0.45 g of p-toluene sulphonic acid was added. The temperature was now further raised to an reflux temperature of 120° C., at which temperature water started to form. The reaction was allowed to continue for a further 330 minutes until an acid value of 20 mg KOH/g was reached, after which time 0.45 g of Ca (OH)$_2$ and a filtering aid were added and the warm solution was passed through a pressure filter. Resulting filtrate was then concentrated in a roll-evaporator and the final product was recovered.

Obtained product exhibited the following properties:

Final acid value, mg KOH/g: 19.0

Theoretical molecular weight, g/mole: 8766

Viscosity, Brookfield, 23° C., mPas: 37 400

Non-volatile content, %: 96.3

EXAMPLE 5

A thermosetting resin composition was prepared by mixing the product according to Example 4 and a commercial isophthalic unsaturated polyester diluted in styrene (Norpol® 200–000, Jotun Polymer A/S, Norway) with curatives consisting of methyl ethyl ketone (MEK) peroxide (Akzo Nobel, the Netherlands) and cobalt-2-ethyl hexanoate (NL53, Akzo Nobel, The Netherlands). The components were mixed at 40° C. using mechanical stirring for 5 minutes. The resin was subsequently degassed at room temperature in a vacuum chamber at 0.1 bar for 1–2 minutes.

The resin composition had the following formulation and properties:

Product according to example 4, g: 10.0

Norpol® 200–000, g: 90.0

MEK-peroxide, g: 2.0

Co-2-ethyl hexanoate (10%-w/w Co), g: 0.1

EXAMPLE 6—Comparative Example

A thermosetting resin composition was prepared by mixing a commercial isophthalic unsaturated polyester (Norpol® 200–000, Jotun Polymer A/S, Norway) with curatives consisting of methyl ethyl ketone (MEK) peroxide (Akzo Nobel, the Netherlands) and cobalt-2-ethyl hexanoate (NL53, Akzo Nobel, The Netherlands)

The resin was subsequently degassed at room temperature in a vacuum chamber at 0.1 bar for 1–2 minutes.

The resin composition had the following formulation and properties:

Norpol® 200–000, g: 100.0

MEK-peroxide, g: 2.0

Co-2-ethyl hexanoate (10%-w/w Co), g: 0.1

Example 7

Thermosetting resin compositions according to Examples 5 and 6 were at 23° C. poured into steel moulds having the internal dimensions 110×27×2.5 mm and 27×25×10 mm, respectively. The moulds were pre-treated with a silicone based mould release agent. The resin compositions were cured in the moulds, resulting in moulded plastic specimens having dimensions equal to the internal dimensions of the moulds. Curing was performed in an oven with circulating air and according to below schedule:

Heating ramp: 23–100° C., gradient 0.3° C./min

Hold: 100° C. for 300 minutes

Cooling ramp: 100–23° C., gradient 0.3° C./minute

EXAMPLE 8

Samples were cut from the plastic specimens produced from the resin compositions of Examples 5 and 6, which resin compositions were moulded and cured according to Example 7. Cutting was made by a rotating saw blade and the edges of the samples were polished with a 240 grid sand paper and rinsed with demineralised water. The samples were subsequently dried and aged at 23° C. for at least 7 days. Chips were, using a razor blade, prior to testing cut from the samples.

The glass transition temperatures ($T_g$) were recorded on a Perkin-Elmer DCS7 (Differential Scanning Calorimeter) apparatus using the following parameters:

Average sample weight, mg: 20

Temperature range, ° C.: 0–130

Heating gradient, ° C./min: 10

Cooling gradient, ° C./min: 150

Stabilization time at ° C., min: 5

Heating gradient, ° C./min: 10

Obtained results are given in Table 1

EXAMPLE 9

Samples having the dimensions 100×12×2.5 mm were cut from the plastic specimens from the resins compositions according to Examples 5 and 6, which specimens were moulded and cured in 110×27×2.5 mm moulds according to Example 7. Cutting was made by a rotating saw blade and the edges of the samples were polished with a 400 grid sand paper.

The tensile modulus (E) and Strain to Break ($\epsilon$) were recorded on an Instron tensile testing apparatus equipped with an extensometer.

The following parameters were used:

Extensometer gauge length, mm: 35

Length between grips, mm: 70

Crosshead rate, mm/min: 2

Obtained results are given in Table 1:

EXAMPLE 10

Samples were, using a rotary saw blade, cut from the plastic specimens produced from the resin compositions according to Examples 5 and 6 which compositions were moulded and cured in 27×25×10 mm mould in accordance with Example 7. The samples were cut to the exterior dimensions 25×25×10 mm and machined for compact tension tests according to ASTM E399.

Critical Stress Intensity Factors ($K_{1c}$) according to ASTM E399 were recorded on a Zwick Screw tensile testing apparatus using a crosshead rate of 0.5 mm/min.

Obtained results are given in Table 1.

EXAMPLE 11

The fracture energies, expressed as $G_{1c}$, were determined from the results obtained in Examples 9 and 10 according to the following equation:

$$G_{1c} = \frac{K_{1c}^2}{E}(1 - v^2)$$

wherein $G_{1c}$=Fracture Energy (J/m$^2$)

$K_{1c}$=Critical Stress Intensity Factor (MPa.m$^{1/2}$)

E=Tensile Modulus (GPa)

$v$=Poisson Ratio

Obtained results are given in Table 1.

TABLE 1

Results obtained in examples 8–11.

| Moulded material | Example 5 | Example 6 |
|---|---|---|
| $T_g$, °C. | 89 | 89 |
| E, GPa | 2.6 | 3.0 |
| $\epsilon$, % | 6.3 | 5.0 |
| $K_{1c}$, MPa.m$^{1/2}$ | 0.71 | 0.59 |
| $G_{1c}$, J/m$^2$ | 176 | 106 |

Table 1 illustrates the benefits in mechanical properties using moulded materials based on thermosetting compositions according to the invention as opposed to non-modified materials. The present invention is thus of significant importance in the quest for improved mechanical properties in for instance thermosetting materials. An extensive toughening effect can be reached with the claimed invention compared to non-modified materials. There is further no major negative effect in other critical properties such as tensile modulus and glass transition temperature which otherwise often is the case when conventional tougheners such as rubbers are used.

I claim:

1. A branched alkenyl functional polyester comprising a prepolymer having at least one carboxyl group and m hydroxyl groups, m being an integer of at least 3, which prepolymer is a condensation product obtained by condensing at least one monomer selected from the group consisting of di, tri or polyhydroxyfunctional monocarboxylic acids having 2 to 18 carbon atoms, optionally followed by further chain extension by addition of at least one monohydroxyfunctional monocarboxylic acid or lactone having 2 to 24 carbon atoms, the addition being performed by a molar ratio condensation product to monohydroxyfunctional monocarboxylic acid or lactone in the ranae of 1:1 to at least 1:m, the prepolymer being made alkenyl functional by addition of at least one monomeric or polymeric compound having at least one allylic or acrylic unsaturation, the addition being performed at a molar ratio of said prepolymer to said allylic or acrylic compound in the range of 1:1 to at least 1:m, whereby a branched alkenyl functional polyester having at least one allylic or acrylic unsaturation is formed.

2. The alkenyl functional polyester according to claim 1 wherein the di, tri or polyhydroxyfunctional nomocarboxylic acid of the prepolymer is selected from the group consisting of dihydroxy, di(hydroxymethyl), trihydroxy and tri(hydroxymethyl) monocarboxylic acids having 2 to 18 carbon atoms.

3. The alkenyl functional polyester according to claim 2 wherein the di, tri or polyhydroxyfunctional monocarboxylic acid of the prepolymer is selected from the group consisting of 2,2-dimethylpropionic acid, $\alpha,\alpha$-bis(hydroxymethyl)butyric acid, $\alpha,\alpha,\alpha,$-tris(hydroxymethyl)acetic acid, $\alpha,\alpha$-bis(hydroxymethyl)valeric acid, $\alpha,\alpha$-bis(hydroxy)propionic acid, $\alpha,\beta$-dihydroxyproponic acid, 3,5-dihydroxybenzoic acid, heptonic acid and mixtures thereof.

4. The alkenyl functional polyester according to claim 1 wherein the optional monohydroxyfunctional monocarboxylic acid or lactone, having said 2 to 24 carbon atoms, of the prepolymer is selected from the group consisting of hydroxyacetic acid, hydroxyvaleric acid, hydroxypropionic acid, hydroxypivalic acid, hydroxystearic acid, glycolide, $\delta$-valerolactone, $\beta$-propiolactone, $\epsilon$-caprolactone and mixtures thereof.

5. The alkenyl functional polyester according to claim 1 wherein said compound having at least one allylic unsaturation is at least one allvlhalide wherein said addition occurs by reaction between said at least one allylhalide and at least one hydroxy group of the prepolymer period.

6. The alkenyl functional polyester according to claim 5 wherein said allylhalide is allylchloride or allylbromide.

7. The alkenyl functional polyester according to claim 1 wherein said compound having at least one allylic or acrylic unsaturation is selected from the group consisting of adducts between at least one di, tri or polycarboxylic acid or anhydride and at least one allyl or acryl functional alcohol having at least one allylic unsaturation and at least one reactive hydroxyl group, whereby said addition is performed by esterification or transesterification.

8. The alkenyl functional polyester according to claim 7 wherein the di, tri or polycarboxylic acid or anhydride is an aliphatic dicarboxylic acid or anhydride, having 3 to 30 carbon atoms, selected from the group consisting of maleic acid, maleic anhydride, fumaric acid, adipic acid, azelaic acid, succinic acid, succinic anhydride, sebacic acid, diglycolic acid, trimelletic anhydride, glutaric anhydride and mixtures thereof.

9. The alkenyl functional polyester according to claim 7 wherein the allyl functional alcohol is an alkanol allyl ether.

10. The alkenyl functional polyester according to claim 9 wherein the alkanol allyl ether is selected from the group consisting of glycerol monoallyl ether, glycerol diallyl ether, trimethylolethane monoallyl ether, trimethylolethane diallyl ether, trimethylolpropane monoallyl ether, trimethylolpropane diallyl ether, pentaerythritol monoallyl ether, pentaerythritol diallyl ether, pentaerythritol triallyl ether and mixtures thereof.

11. The alkenyl functional polyester according to claim 7 wherein said adducts are reaction products between azelaic acid, succinic acid, succinic anhydride or sebacic acid and glycerol diallyl ether, trimethylolethane diallyl ether, trimethylolpropane diallyl ether or pentaerythritol triallyl ether.

12. The alkenyl functional polyester according to claim 1 wherein said compound having at least one acrylic unsaturation is selected from the group consisting of acrylic acid, methacrylic acid and crotonic acid and wherein said addition is performed by esterification.

13. A resin composition comprising the alkenyl functional polyester according to claim 1 and at least one aliphatic, cycloaliphatic or aromatic monomeric or polymeric compound or resin, said compound or resin being present in an amount of 1 to 99% by weight, and optionally additives selected from the group consisting of a curing agent, a drying agent, a catalyst, an inhibitor, a stabilizer, a solvent and mixtures thereof.

14. The resin composition according to claim 13 wherein said compound or resin is a saturated or an unsaturated ester or polyester.

15. The resin composition according to claim 13 wherein said compound or resin is a hydroxyfunctional saturated or unsaturated ester or polyester.

16. The resin composition according to claim 14 wherein said saturated ester or polyester has at least one maleic, vinylic, allylic or acrylic unsaturation.

17. The resin composition according to claim 14 wherein said compound or resin is a carboxyfunctional saturated or unsaturated ester or polyester.

18. The resin composition according to claim 14 wherein said saturated or unsaturated polyester of general formula

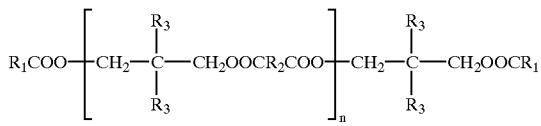

wherein each $R_1$ independently is an alkanyl or alkenyl moiety of a saturated or unsaturated monofunctional carboxylic acid, each $R_2$ independently is an alkanyl, alkenyl or aryl moiety of a difunctional saturated or unsaturated carboxylic acid, each $R_3$ independently is hydrogen or unesterified alkanyl or alkenyl and wherein n is an integer being at least 1.

19. The resin composition according to claim 14 wherein said saturated or unsaturated polyester of general formula

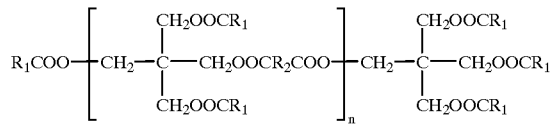

wherein each $R_1$ independently is an alkanyl or alkenyl moiety of a saturated or unsaturated monofunctional carboxylic acid, each $R_2$ independently is an alkanyl, alkenyl or aryl moiety of a difunctional saturated or unsaturated carboxylic acid and wherein n is an integer being at least 1.

20. The resin composition according to claim 13 comprises at least one dendritic macromolecule, said macromolecule comprising a monomeric or polymeric nucleus having at least one reactive epoxide or hydroxyl group to which 1 to 100 generations, said generations comprising at least one monomeric or polymeric chain extender having at least two reactive hydroxy groups and at least one reactive carboxyl group or at least two reactive carboxyl groups and at least one reactive hydroxyl group, whereby a macromolecule is obtained, said macromolecule optionally provided with at least one primary or secondary epoxide, amino, alkenyl or anhydride group.

21. The resin composition according to claim 13 comprising at least one monomer or diluent having at least one maleic, vinylic, allylic or acrylic unsaturation.

22. The resin composition according to claim 21 wherein said monomer or diluent is an ester of acrylic acid, methacrylic acid or crotonic acid and an alcohol.

23. The resin composition according to claim 21 wherein said monomer or diluent is a vinylic compound.

24. A thermosetting material comprising a cured or partially cured resin composition of claim 13.

25. The thermosetting material according to claim 24 wherein said cured or partially cured resin composition is a molding powder.

26. The thermosetting material according to claim 24 wherein said cured or partially cured resin composition is a decorative or industrial laminate.

27. A thermosetting material comprising a prepreg, said prepreg obtained by partially curing, to a B-stage, of a roll, a sheet, a web, a cloth, threads or cuttings impregnated with the thermosetting resin composition of claim 13.

28. The thermosetting material according to claim 24 wherein said cured or partially cured resin composition is a coating.

29. The thermosetting material according to claim 24 wherein said cured or partially cured resin composition is an adhesive or a glue.

30. A thermosetting material according to claim 24 comprising an additive, said additive selected from the group consisting of a filler, a pigment, a lubricant, a reinforcing material and mixtures thereof.

31. A thermosetting material according to claim 30 wherein said reinforcing material is fibers, said fibers selected from the group consisting of glass fibers, carbon fibers, aramide fibers and organic fibers.

32. A thermosetting material in accordance with claim 31 wherein said fibers are provided in the form of a web, a cloth, a sheet or threads.

* * * * *